US010822177B2

(12) United States Patent
Wicks et al.

(10) Patent No.: US 10,822,177 B2
(45) Date of Patent: Nov. 3, 2020

(54) METHOD AND SYSTEM FOR MANIPULATING ARTICLES

(71) Applicants: INTELLIGRATED HEADQUARTERS, LLC, Mason, OH (US); CARNEGIE MELLON UNIVERSITY, Pittsburgh, PA (US)

(72) Inventors: Matthew R. Wicks, St. Charles, MO (US); Gabriel Goldman, Pittsburgh, PA (US); D. W. Wilson Hamilton, Bethel Park, PA (US)

(73) Assignees: Intelligrated Headquarters, LLC, Mason, OH (US); Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 16/405,041

(22) Filed: May 7, 2019

(65) Prior Publication Data
US 2019/0344974 A1 Nov. 14, 2019

Related U.S. Application Data

(60) Provisional application No. 62/669,093, filed on May 9, 2018.

(51) Int. Cl.
*B65G 47/91* (2006.01)
*B65G 47/248* (2006.01)
*B25J 15/06* (2006.01)

(52) U.S. Cl.
CPC .......... *B65G 47/248* (2013.01); *B65G 47/91* (2013.01); *B65G 47/914* (2013.01); *B25J 15/0616* (2013.01)

(58) Field of Classification Search
CPC ...... B65G 47/24; B65G 47/14; B65G 47/248; B65G 2201/0244; B65G 2203/0225;
(Continued)

(56) References Cited

U.S. PATENT DOCUMENTS 4,571,320 A 2/1986 Walker
4,613,942 A 9/1986 Chen
(Continued)

FOREIGN PATENT DOCUMENTS

CA 2963064 C 2/2018
CN 204954848 U 1/2016
(Continued)

OTHER PUBLICATIONS

Vacuum Suctions Cups, Vacuforce LLC, [online], [retrieved Aug. 6, 2019], retrieved from the Internet <URL: http://www.vacuforce.com/products.html> (2 pages).
(Continued)

*Primary Examiner* — Gregory W Adams
(74) *Attorney, Agent, or Firm* — Alston & Bird LLP

(57) ABSTRACT

Various example embodiments described herein relate to a flipper table for manipulating an item from a first orientation to a second orientation. The flipper table includes a body rotatable about an axis. The body includes an end configured to be mechanically attached to an actuation unit. In this regard, upon an actuation of the actuation unit, the body is configured to manipulate the item. The body further defines a top surface configured to support the item positioned thereon. The body also defines at least one tab disposed on the flipper table and configured to extend relative to the top surface. Furthermore, the body of the flipper table defines one or more suction cups disposed on the top surface of the body where the one or more suction cups are configured to engage to a surface of the item positioned on the top surface.

20 Claims, 8 Drawing Sheets

(58) Field of Classification Search
CPC ............ B65G 2811/0626; B65G 57/04; B65G 47/086; B65G 1/1378; H01L 21/681; H01L 21/68
See application file for complete search history.

(56) References Cited

U.S. PATENT DOCUMENTS

| | | | |
|---|---|---|---|
| 4,634,328 A | | 1/1987 | Carrell |
| 4,741,567 A | | 5/1988 | Zimmer et al. |
| 4,897,689 A | | 1/1990 | De et al. |
| 4,987,332 A | | 1/1991 | Yamamoto et al. |
| 5,542,729 A | * | 8/1996 | Ohtonen ............... B65B 25/148 294/65 |
| 6,015,174 A | | 1/2000 | Raes et al. |
| 6,761,527 B2 | * | 7/2004 | Eisenzimmer ..... B29D 30/0016 294/65 |
| 7,648,322 B2 | * | 1/2010 | Moncrief ................. B65H 1/30 294/65 |
| 8,880,216 B2 | * | 11/2014 | Izumi .................... B25J 9/1697 198/395 |
| 9,120,635 B2 | * | 9/2015 | Su ........................... B65H 15/00 |
| 9,492,923 B2 | | 11/2016 | Wellman et al. |
| 9,492,926 B2 | * | 11/2016 | Mattern ................ B25J 9/1612 |
| 9,498,887 B1 | | 11/2016 | Zevenbergen et al. |
| 9,707,682 B1 | | 7/2017 | Konolige et al. |
| 9,926,138 B1 | | 3/2018 | Brazeau et al. |
| 2005/0072656 A1 | | 4/2005 | Costanzo |
| 2005/0281662 A1 | | 12/2005 | Carey et al. |
| 2009/0028676 A1 | | 1/2009 | Langlot et al. |
| 2009/0200139 A1 | | 8/2009 | Kissee et al. |
| 2009/0218193 A1 | * | 9/2009 | Malini .................... B65B 35/58 198/379 |
| 2010/0078953 A1 | | 4/2010 | Ban et al. |
| 2010/0239408 A1 | | 9/2010 | Becker et al. |
| 2012/0205928 A1 | | 8/2012 | La et al. |
| 2014/0126988 A1 | | 5/2014 | Qi et al. |
| 2015/0344225 A1 | | 12/2015 | Nakamura et al. |
| 2016/0139438 A1 | * | 5/2016 | Jing ...................... G02F 1/1303 445/24 |
| 2016/0243590 A1 | | 8/2016 | Crest et al. |
| 2017/0062263 A1 | | 3/2017 | Besil et al. |
| 2017/0165717 A1 | | 6/2017 | Crest et al. |
| 2017/0203443 A1 | | 7/2017 | Lessing et al. |
| 2017/0349385 A1 | | 12/2017 | Moroni et al. |
| 2018/0022557 A1 | | 1/2018 | Tanaka et al. |
| 2018/0053144 A1 | | 2/2018 | Wellman |

FOREIGN PATENT DOCUMENTS

| | | |
|---|---|---|
| CN | 107444909 A | 12/2017 |
| CN | 107745963 A | 3/2018 |
| CN | 207273223 U | 4/2018 |
| DE | 2357118 A1 | 5/1975 |
| DE | 102007054867 A1 | 5/2009 |
| DE | 102012009649 A1 | 11/2013 |
| EP | 1066587 B1 | 11/2007 |
| EP | 2329925 A1 | 6/2011 |
| JP | 2000-006074 A | 1/2000 |
| JP | 2010-188465 A | 9/2010 |
| JP | 2010-278408 A | 12/2010 |
| JP | 2015-153837 A | 8/2015 |
| JP | 2016-145115 A | 8/2016 |
| JP | 2017-124469 A | 7/2017 |
| WO | 2010/109923 A1 | 9/2010 |
| WO | 2012/144120 A1 | 10/2012 |
| WO | 2016/054561 A1 | 4/2016 |

OTHER PUBLICATIONS

Extended European Search Report for Application No. 19173383.1, dated Sep. 16, 2019, 10 pages.
Extended European Search Report for European Application No. 19173385.6 dated Sep. 27, 2019.
Office Action for European Application No. 19173385.6 dated Nov. 18, 2019.
Partial European Search Report for Application No. 19173384.9, dated Oct. 17, 2019, 15 pages.
Comminication pursuant to Rules 70(2) and 70a(2), for European Application No. 19173384.9, dated Mar. 30, 2020.
Extended European Search Report for Application No. 19173384.9, dated Feb. 21, 2020, 20 pages.

* cited by examiner

600

602 — RECEIVING, BY A FLIPPER TABLE, AN ITEM IN A FIRST ORIENTATION, WHERE THE FLIPPER TABLE COMPRISES A BODY CONFIGURED TO MANIPULATE THE ITEM FROM THE FIRST ORIENTATION TO A SECOND ORIENTATION, THE BODY COMPRISING: A TOP SURFACE CONFIGURED TO SUPPORT THE ITEM THEREON, AT LEAST ONE TAB DISPOSED ON THE FLIPPER TABLE AND CONFIGURED TO EXTEND RELATIVE TO THE TOP SURFACE, AND ONE OR MORE SUCTION CUPS DISPOSED ON THE TOP SURFACE OF THE BODY;

604 — ENGAGING, BY THE ONE OR MORE SUCTION CUPS, A SURFACE OF THE ITEM; AND

606 — UPON ENGAGING THE ITEM, ROTATING THE FLIPPER TABLE ABOUT AN AXIS TO POSITION THE ITEM IN THE SECOND ORIENTATION

FIG. 6

METHOD AND SYSTEM FOR MANIPULATING ARTICLES

CROSS-REFERENCE TO RELATED APPLICATIONS

This application claims the benefit of U.S. Provisional Patent Application No. 62/669,093, entitled "Method and System for Reorienting Articles," filed on May 9, 2018, the disclosure of which is hereby incorporated by reference in its entirety.

TECHNOLOGICAL FIELD

Example embodiments of the present invention relate generally to a material handling system for handling items, and, more particularly, to an item manipulation system of the material handling system for manipulating one or more items in a material handling environment.

BACKGROUND

Material handling systems are able to convey, sort, and organize items (e.g. cartons, cases, containers, shipment boxes, totes, packages, and/or the like) at high speeds. Depending on a configuration of the material handling system, the items may travel through a material handling environment in an unregulated manner, or may be repositioned, reoriented, and/or consolidated into a single stream of items on conveyors and/or other locations. Material handling systems may rely on conveyors, conveyor controllers, and/or warehouse management systems including equipment that organizes items conveyed and/or handled.

Generally, material handling systems include equipment adapted to pick the items and change an orientation of the items or re-position the items from one location to another location, within the material handling environment. For instance, robotic tools may be installed or deployed at various locations within the material handling environment, for picking the items and further manipulating these items (e.g., re-orienting and/or re-positioning the items).

Applicant has identified several technical challenges associated with techniques for handling and manipulating items, in a material handling environment, and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to methods and systems for manipulating items in a material handling environment. According to some example embodiments, a flipper table for manipulating one or more items, is described. The flipper table includes a body rotatable about an axis. The body defines an end which is configured to be mechanically attached to an actuation unit. Based on an actuation of the actuation unit, the body is configured to manipulate an item from a first orientation to a second orientation. The body of the flipper table further defines a top surface which is configured to support the item positioned thereon. Further, the body defines at least one tab which is disposed on the flipper table and is configured to extend relative to the top surface of the body of the flipper table. The body of the flipper table also includes one or more suction cups disposed on at least the top surface of the body. In this regard, the one or more suction cups are configured to engage to a surface of the item positioned on the top surface.

In some example embodiments, the body further defines a bottom surface opposite the top surface. The bottom surface is also adapted to support another item positioned thereon. In this aspect, the bottom surface of the body also defines one or more bottom suction cups.

In some example embodiments, the flipper table is configured to rotate about the axis so as to reposition the item supported on the top surface from the first orientation to the second orientation. Similarly, in some example embodiments, the flipper table is configured to rotate about the axis to reposition another item supported by the bottom surface from a third orientation to a fourth orientation. In this aspect, in some examples, the second orientation of the item, correspond to a position in which a first label of the item and/or a second label of another item are exposed in a field of view of a sensing system.

According to some example embodiments described herein, the body of the flipper table defines at least one tab configured to extend through the body of the flipper table and abut the top surface on which the item is positioned. In this aspect, the at least one tab is configured to support the item positioned on the top surface. Furthermore, the at least one tab is configured to facilitate a movement of the flipper table about a plurality of teeth defined by the at least one tab.

In some example embodiments, the flipper table further includes a shaft that is rotatable based on an actuation of the actuation unit. According to some example embodiments, the body the flipper table further includes a central frame adapted to mechanically engage with the shaft, a top plate adapted to mechanically engage with the central frame, and a bottom plate adapted to mechanically engage with the central frame.

According to some example embodiments, an item manipulation system is described. The item manipulation system comprises a mounting unit and a flipper table. The mounting unit described herein includes at least two posts and an arm portion mounted between the at least two posts. The arm portion is pivotably engaged to a first end of a shaft. The arm portion is adapted to move relative to the at least two posts. In accordance with some example embodiments, the flipper table is adapted to manipulate an item from a first orientation to a second orientation. The flipper table is pivotably engaged to a distal end of the arm portion. The flipper table includes a body rotatable about an axis. The body defines an end configured to be mechanically attached with the shaft. Further, the body of the flipper table further includes a top surface configured to support the item positioned thereon. The body further includes, at least one tab disposed on the flipper table and is configured to extend relative to the top surface of the body of the flipper table. The body of the flipper table also includes, one or more suction cups disposed on the top surface of the body. In this regard, the one or more suction cups are configured to engage to a surface of the item positioned on the top surface.

Referring to the item manipulation system, in some example embodiments, the flipper table is adapted to rotate about the axis of the shaft to change an orientation of the item positioned over the top plate of the flipper table in the first orientation to the second orientation.

In some example embodiments, flipper table of the item manipulation system is adapted to manipulate the item positioned in the first orientation on a first conveyor to the second orientation on either first conveyor or a second conveyor.

In some example embodiments, the flipper table of the item manipulation system is rotatable about the shaft so as to orient the flipper table in a stowing position indicative of a standby mode of the flipper table. In the stowing position the top plate and the bottom plate of the flipper table may be positioned proximal and parallel with respect to the at least two posts.

According to some example embodiments, the flipper table is adapted to engage the item via the one or more suction cups of the flipper table so as to the item via movement of the arm portion.

According to some example embodiments, a method for manipulating an item is described. The method includes, receiving by a flipper table, an item in a first orientation. The flipper table includes a body which is configured to manipulate the item from the first orientation to a second orientation. The body of the flipper table includes, a top surface configured to support the item thereon. Further, the body includes, at least one tab disposed on the flipper table. The at least one tab described herein, is configured to extend relative to the top surface of the flipper table. The body of the flipper table further includes one or more suction cups disposed on the top surface. Upon receiving the item by the flipper table, the method further includes, engaging, by the one or more suction cups, a surface of the item. Upon engaging the item, the method includes, rotating the flipper table about an axis to position the item in a second orientation.

In some example embodiments, the method of manipulating the item includes receiving, the item in the first orientation on either the top surface or a bottom surface of the flipper table from a conveyor unit which is proximately positioned to the flipper table. In this regard, the bottom surface of the flipper table includes one or more bottom suction cups which are adapted to engage to a surface of the item.

In some example embodiments, the engagement of the one or more suction cups on the flipper table is based on: (a) detecting, by a processing unit, the item to be positioned in the first orientation. The processing unit detects the item to be positioned in the first orientation based on processing sensing data received from a sensing unit. Further, the engagement is based on (b) receiving the input indicative of a requirement of changing an orientation of the item from the first orientation to the second orientation.

In some example embodiments, the method of manipulating the item includes receiving by the flipper table, the item in the first orientation from a first conveyor and positioning the item in the second orientation on either the first conveyor or a second conveyor.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6 illustrates a flowchart representing a method of manipulating an item by the item manipulation system, in accordance with some example embodiments described herein.

DETAILED DESCRIPTION

Figure 1:
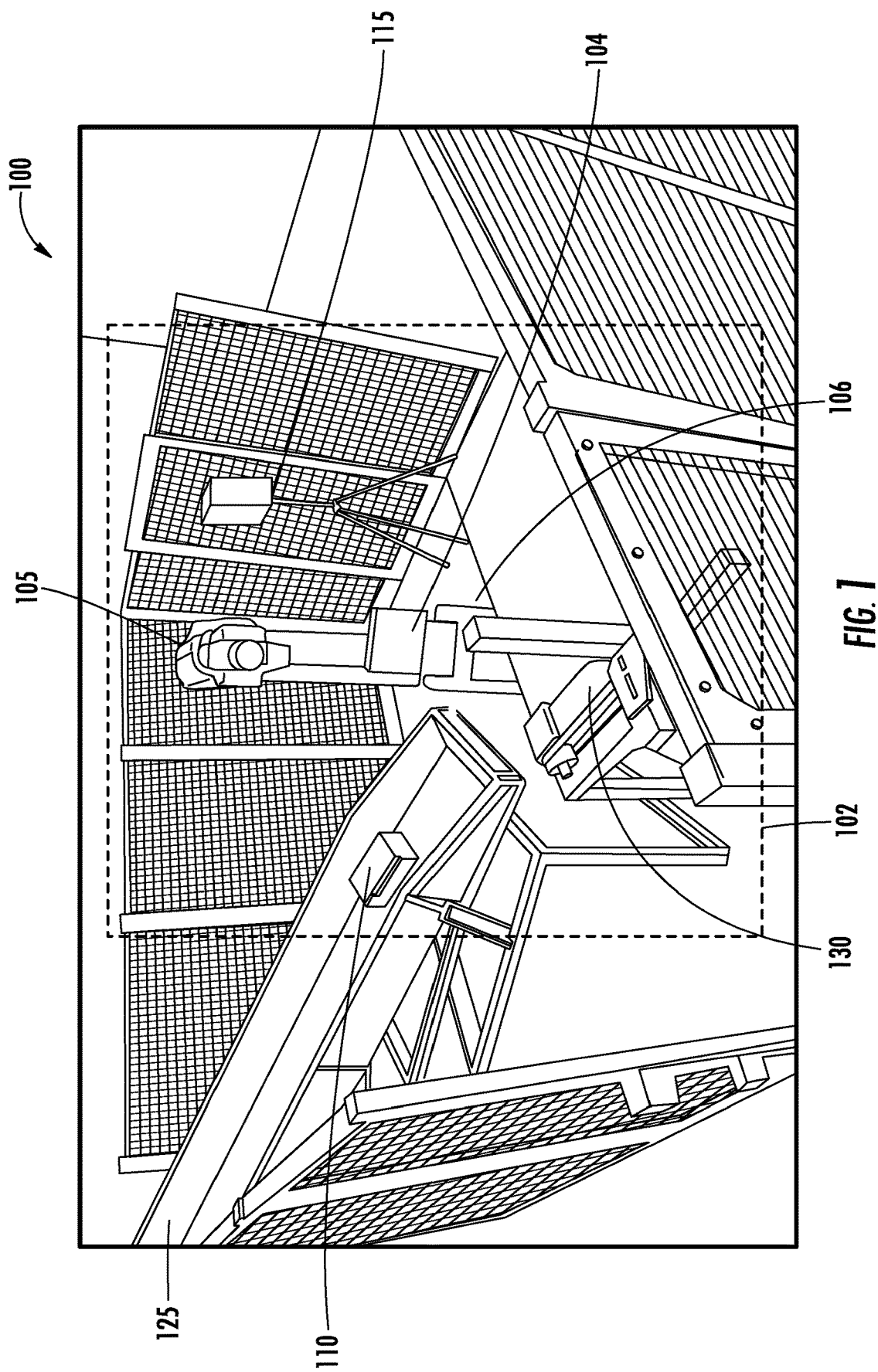
FIG. 1 illustrates a perspective view of a material handling environment comprising an item manipulation system, in accordance with some example embodiments described herein.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

In material handling environments, such as, but not limited to, distribution centers, warehouses, inventories, or shipping centers, various equipment such as robotic arms, item manipulators, conveyor overhead units, and/or the like are used for performing various operations. For instance, this equipment is used for manipulating items located in the material handling environment and/or in transit on some conveyors. Manipulating the items may involve performing operations such as, but not limited to, picking, re-orienting, placing, stacking, un-stacking, lifting, repositioning, and/or relocating the items.

In some material handling systems, robotic tools having end effectors are installed that are configured to perform the manipulation of items. The item manipulation may be used to change an orientation of the item so as to expose a label of the item to an operator or in a field of view of a sensing system. The labels may be associated with or otherwise indicative of these items. For instance, some items may include a label including indicia or coded information (e.g., barcodes, QR codes, DPM codes and/or the like) that are scanned and decoded by an operator or a scanning system (e.g., a bi-optic scanner installed on a conveyor) for uniquely identifying the items and retrieving information associated with the items. In this aspect, as the items are unloaded or placed on conveyors, often these labels of the items may be located on a surface of the items that is not exposed to a field of view of the sensing system. For example, in some situations, an item in transit on a conveyor may include a label affixed on a bottom surface of the item which may not be visible into a field of view of the scanning system.

Orientation of the items including the label is critical, as these items are often inducted onto a sortation or downstream conveyor and handled by equipment like robotic tools, sorters, or end effectors, within the material handling system. This equipment is often actuated based upon information associated with the item that is retrieved after scanning the identifiers on the labels of the items. Thus, it is often desired to re-orient the item on the conveyor such that the label of the item is visible in the field of view of the scanning system or to an operator for scanning an identifier on the label manually. Also, manually changing orientation of each item on the conveyor is time-consuming and causes loss of overall productivity of operators and thereby effects throughput of the material handling system. Further, it is desired to have equipment that may manipulate the item by re-orienting or re-positioning the item, without disrupting ongoing workflow or operations in the material handling environment.

Various example embodiments described herein relate to a flipper table that is configured to manipulate an item from a first orientation to a second orientation in a material handling system. The flipper table includes a body that defines a top surface to support an item positioned thereon in the first orientation. The body of the flipper table is adapted to engage with the item and rotate about an axis to so as to re-position or re-orient the item into the second orientation. In this regard, the body of the flipper table includes one or more suction cups disposed on the top surface. The one or more suction cups are adapted to engage with a surface of the item. Thus, for manipulating the item from the first orientation to the second orientation, the flipper table receives the item in the first orientation on the top surface of the flipper table. As the item is positioned on the top surface of the flipper table and an input indicating a requirement of changing the orientation of the item is received by a controller controlling the flipper table, a surface of the item is engaged by the one or more suction cups disposed on the top surface of the flipper table. In this aspect, the one or more suction cups engage the item based on a vacuum suction force generated through the one or more suction cups. Further, upon engagement of the item on the top surface, the flipper table is rotated about an axis so that the item engaged on the flipper table follows the rotation of the flipper table. In this aspect, the flipper table may be rotated to any degrees, for instance, within a range from about 0 degrees to about 360 degrees depending on a desired orientation of the item. Accordingly, the flipper table is rotated to position the item in a second orientation different from the first orientation. In some cases, the second orientation herein, may correspond to a position in which a label on the item is exposed to an operator or to a field of view of a sensing system.

In some example embodiments, in a material handling system, the item manipulation system may be positioned adjacent to or in a proximity to a downstream conveyor. In this way, items on the conveyor that are identified to be manipulated or re-oriented may be manipulated by the flipper table of the item manipulation system without disrupting ongoing operations of the material handling system.

Having described an example embodiment at a high level, the design of the various devices performing various example operations is provided below.

FIG. 1 illustrates a perspective view of a material handling system 100 comprising an item manipulation system 102, in accordance with one or more embodiments of the present disclosure. In accordance with various example embodiments described herein, the material handling system 100 may include a variety of components and/or subsystems, such as, but not limited to, an induction conveyor, a sortation system, chutes, identification systems, vision systems, robotic subsystems, and the like, for handling and processing items in a material handling environment. In some example embodiments, the material handling system 100 includes the item manipulation system 102 that is configured to manipulate the item from a first orientation to a second orientation. The item manipulation system 102 may include equipment such as, but not limited to, a robotic tool for manipulating the item. For instance, in some example embodiments, the item manipulation system 102 includes a flipper table 104 which is configured to reorient an item 110 from a first orientation to a second orientation. According to some example embodiments, the material handling system 100 may also include a repositioning system 105 for example a robotic arm for receiving the item 110 in a first orientation from a chute 125 and/or a conveyor (not shown), and placing the item on a top surface of the flipper table 104 of the item manipulation system 102. Thereafter, upon receiving the item 110 from on the top surface of the flipper table 104, the flipper table 104 may reorient the item 110 to a second orientation for placement onto a conveyor and/or any downstream subsystem of the material handling system 100.

In some example embodiments, the material handling system 100 may further include, a vision system 115 having one or more sensors positioned at locations within the material handling system 100 and configured to generate inputs corresponding to one or more characteristics of the item 110. While the vision system 115 is shown as a standalone camera in FIG. 1, the vision system 115 is not limited to the implementation shown in FIG. 1. In some example embodiments, the vision system 115 may include a network of imagers, sensors, cameras, identification systems, and the like, for determining characteristics of one or more items being conveyed in the material handling system 100. In accordance with some example embodiments described herein, the characteristics of the item 110 determined by the vision system 115 may include a size, weight, position, edge detection, marker, and/or label detection, positioning of a label including identifiers such as, but not limited to, barcodes, QR codes, orientation, and/or the like on the item 110.

In accordance with various example embodiments described herein, the characteristics of the item 110 may be used to control one or more subsystems such as the repositioning system 105 and/or the item manipulation system 102 including the flipper table 104. The material handling system 100 may further, include a controller (not shown) in communication with one or more of the repositioning system 105, the item manipulation system 102 including the flipper table 104, or the vision system 115. In accordance with various example embodiments described herein, the controller may include at least one processor that may execute instructions to cause the item manipulation system 102 to perform specific operations.

In accordance with some example embodiments of the present disclosure, the processor may execute instructions to cause the vision system 115 to detect that the item 110 is positioned in a first orientation. For instance, the vision system 115 may detect that the item 110 is positioned in the first orientation in the chute 125. In some example embodiments, the processor may further execute instructions to cause the repositioning system 105 to pick the item 110 in the first orientation from the chute 125 and place the item 110 on the flipper table 104. In this regard, a top surface of the flipper table 104 may receive the item 110 for manipulation by the item manipulation system 102. Further, the processor may execute instructions to cause the item manipulation system 102 to manipulate the item 110 from the first orientation to a second orientation for placement onto a conveyor 130, such as a downstream conveyor within the material handling system 100.

In accordance with some example embodiments described herein, the item 110, such as a parcel, may have a label placed thereon. The label may include an identifier comprising information corresponding to the item, such as, but not limited to, a size, a weight, a delivery address of the parcel or an indication of items within the parcel. In some example embodiments, the information corresponding to the item 110 may be coded in an identifier such as, but not limited to, a barcode, a QR code, a direct part marking code, and/or the like, associated with the item 110. Thus, for handling and processing the item 110, one or more subsystems of the material handling system 100, for instance a scanning system, may scan the identifier on the label of the item 110 at different stages of conveyance. In this aspect, during conveyance, an orientation of the item 110 may change frequently. Thus, the item 110 may be orientated such that the label may not be positioned in view of an identification system for scanning the label. In such scenarios, upon identification of an orientation in which the item 110 is positioned by the vision system 115, the item manipulation system 102 may initiate manipulation of the item 110 from the first orientation to the second orientation.

For example, in some embodiments, the flipper table 104 of the item manipulation system 102 may manipulate the item 110 from the first orientation to a label-up orientation such that, in the label-up orientation, an identifier and/or the label associated with the item 110 may be positioned on a top face of the item 110 for scanning. Said differently, in the second orientation or the label up orientation, the label is positioned on the item 110 such that an identifier on the label is exposed in a field of view of the vision system 115.

Also, in some other example scenarios, the item 110 may be oriented such that the label is already positioned in view of the vision system 115 or the scanning system, for scanning the label. In such cases, the controller may determine the first orientation of the item 110 and whether a top surface of the item 110 includes the label. In response to determining that the top surface of the item 110 includes the label, the controller may instruct the item manipulation system 102 and/or any other subsystem of the material handling system 100 to transfer the item 110 to the conveyor 130 in the first orientation, that is, without reorienting the item 110.

Figure 2:
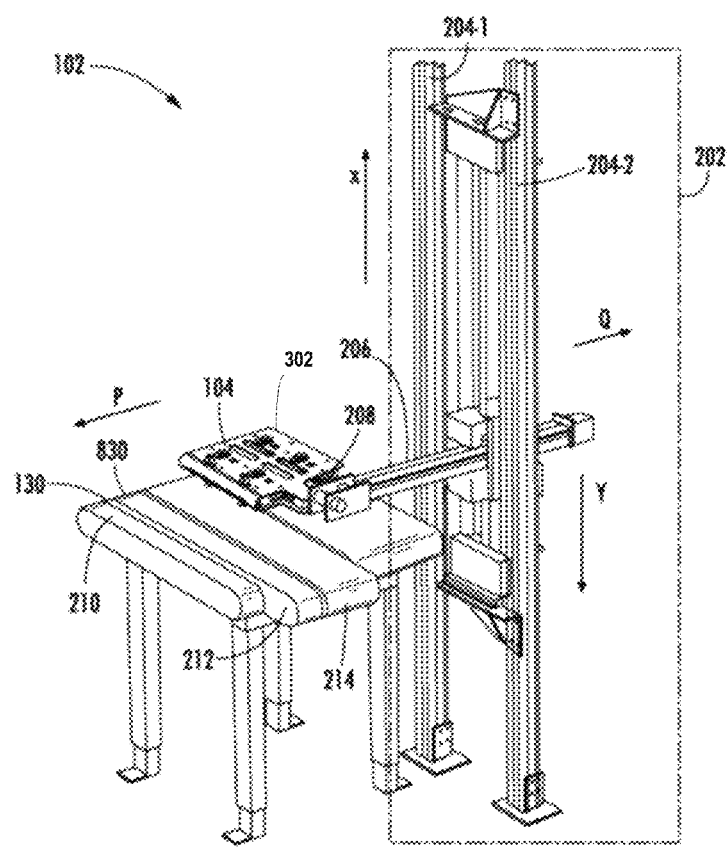
FIG. 2 illustrates a perspective view of the item manipulation system of FIG. 1, in accordance with some example embodiments described herein.

FIG. 2 illustrates a perspective view of the item manipulation system 102, in accordance with some example embodiments described herein. As shown, the item manipulation system 102 includes the flipper table 104. The item manipulation system 102 also includes a mounting unit 202 on which the flipper table 104 is mounted. The item manipulation system 102 comprises at least two posts (e.g., posts 204-1 and 204-2) and an arm portion 206. The arm portion 206 of the mounting unit may be mounted between the at least two posts (e.g., posts 204-1 and 204-2) and pivotably engaged to one end of a shaft 208.

In accordance with various example embodiments described herein, the arm portion 206 is adapted to move relative to the at least two posts (e.g., posts 204-1 and 204-2). For instance, in some example embodiments, the arm portion 206 may be adapted to move upwards in a direction X and downwards in a direction Y along the posts 204-1 and 204-2 and/or outwards relative to the at least two posts 204-1 and 204-2 in a direction P and inwards relative to the at least two posts 204-1 and 204-2 in a direction Q.

As illustrated, the flipper table 104 is pivotally connected to a distal end of the arm portion 206 through the shaft 208. The shaft 208 illustrated herein is connected at one end of the flipper table 104 and is adapted to rotate about its axis, thereby rotating the flipper table 104. The rotation of the shaft 208 may be caused based on a drive motor of the flipper table 104, details of which are described hereafter with reference to FIGS. 3a and 3b. In accordance with various example embodiments described herein, the flipper table 104 may receive one or more items, for example the item 110, for manipulation by the flipper table 104. For example, the flipper table 104 may receive the item 110 on a top surface of the flipper table 104. Alternatively, in some other examples, the flipper table 104 may receive the item 110 from a conveyor, for example, the conveyor 130 or the chute 125 may be positioned proximate to the flipper table 104. Additionally, and/or alternatively, in some embodiments, the flipper table 104 may also receive one or more items via a bottom surface of the flipper table 104. In this regard, the bottom surface of the flipper table 104 may also include one or more bottom suction cups that may engage the item on the bottom surface. Thus, the flipper table 104 may receive the item 110 for manipulation in the first orientation to the second orientation, on either the top surface or the bottom surface from the chute 125 or from the conveyor 130, respectively. The flipper table 104, upon receiving the item 110, is adapted to position the item in the second orientation which is different from the first orientation. In this regard, in accordance with some example embodiments, the flipper table 104 receives the item 110 in a first orientation and rotates between 0 degrees to 360 degrees, depending on a desired orientation, to place the item 110 onto the conveyor 130 in a second orientation.

The conveyor 130 may include, or may be attached to, an orientation table 210 as shown in FIG. 2. The orientation table 210 may include a plurality of strip belts as shown. Each strip belt may be independently controllable in terms of speed, direction, etc. to convey and/or rotate the item 110, as needed. For example, the orientation table 210 may include a wide belt 212 and a narrow belt 214. In accordance with some example embodiments described herein, the flipper table 104 may place smaller items onto the wide belt 212 for conveyance. For rotating a larger item placed on more than one strip belts, the strip belts contacting the larger item may be driven at different speeds and/or direction to rotate the item 110 in contact with the strip belts. In another embodiment, one or more of the strip belts (e.g., the wide belt 212 and the narrow belt 214) may be driven in one direction so as to convey an item to further downstream conveyors, and/or may be driven in an opposite direction to dispense rejected items off the conveyor 130. The orientation table 210 may also be used for any sortation related application.

Figure 3A:
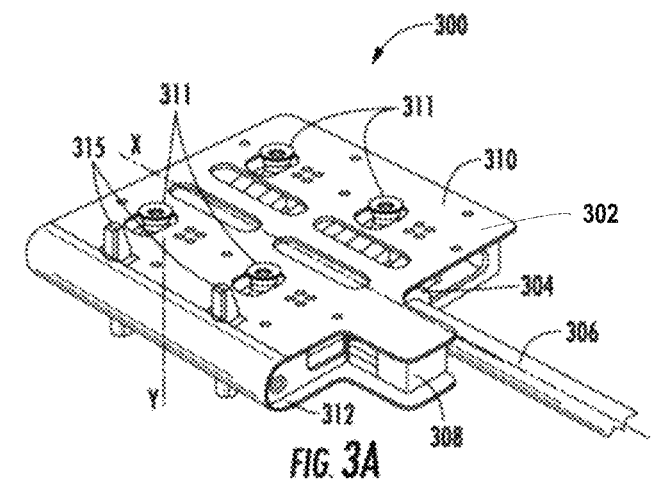
FIGS. 3a and 3b, illustrates a perspective view and exploded view respectively, of a flipper table of the item manipulation system, in accordance with some example embodiments described herein.
Figure 3B:
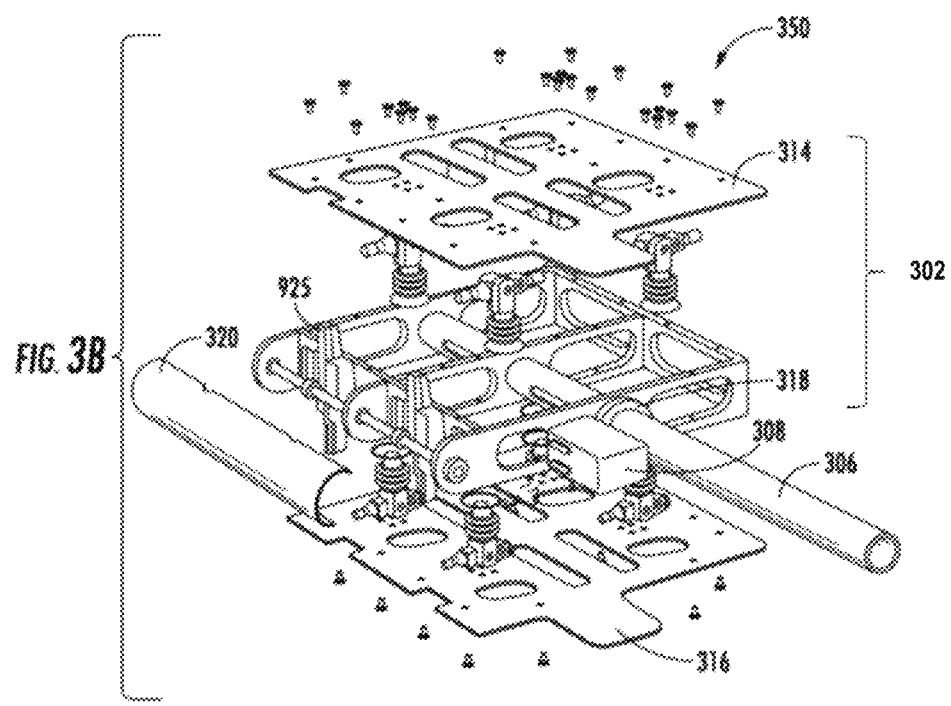

FIGS. 3a and 3b illustrate a perspective view 300 and an exploded view 350, respectively, of the flipper table 104 of the item manipulation system 102, in accordance with some example embodiments described herein. As shown, the flipper table 104 includes a body 302 which is rotatable about an axis X. The body 302 defines an end 304 that is mechanically attached to an actuation unit that may include, for example, but not limited to, an end shaft 306 coupled to a drive motor 308. In this aspect, the drive motor 308 of the actuation unit is adapted to control rotation of the end shaft 306 about the axis X. In accordance with said example embodiments, the body 302 of the flipper table 104 is adapted to manipulate an item from a first orientation to a second orientation, upon actuation of the actuation unit. In this aspect, as the drive motor 308 actuates to rotate the end shaft 306 engaged to the body of the flipper table 104 at the end 304 and the body 302 follows the rotation of the end shaft 306, and rotates along the end shaft 306 about the axis X.

The body 302 of the flipper table 104 defines a top surface 310 and a bottom surface 312 opposite to the top surface 310. In accordance with various example embodiments, the top surface 310 of the flipper table 104 is adapted to support an item (e.g., item 110) positioned thereon. Similarly, the bottom surface 312 is also adapted to support another item supported thereon. The body 302 of the flipper table 104 also defines one or more suction cups 311 disposed on the top surface 310 and/or the bottom surface 312 of the flipper table 104. The suction cups 311 are adapted to grasp and hold a surface of the item 110 while the item 110 is manipulated by the flipper table 104. In this aspect, the suction cups 311 engage with the surface of the item 110 based on a vacuum suction force generated through the respective suction cups 311, by one or more vacuum generators that may be in fluidic communication with the respective suction cups 311.

The body 302 of the flipper table 104 further defines at least one tab 315 (e.g. adjustable height supports). In accordance with various example embodiments described herein, the at least one tab 315 is configured to extend relative to the top surface 310 and/or the bottom surface 312 along the axis Y. In this aspect, the at least one tab 315 is configured to extend relative to the body 302 of the flipper table 104 to support the item 110 positioned thereon on a respective surface of the flipper table 104. In this aspect, the at least one tab 315 defines one or more teeth which supports locking with the body 302 of the flipper table 104 at a desired position. As such, the at least one tab 315 provides a support to the item 110 and further prevents a further relative movement between the at least one tab 315 and the body 302 of the flipper table 104.

In accordance with various example embodiments described herein, the at least one tab 315 is adapted to abut at least the top surface 310 to support the item 110 positioned on the top surface 310. Similarly, the at least one tab 315 is also adapted to abut the bottom surface 312 to support an item held on the bottom surface 312.

As described above, the flipper table 104 may receive an item 110 in a first orientation on any of the top surface 310 or the bottom surface 312. Thus, as the item 110 is received on the top surface 310 and/or the bottom surface 312, the suction cups 311 on respective surfaces of the body 302 may be activated, by the controller, to selectively grasp the item based on the vacuum suction force through the respective suction cups 311. Upon grasping the surface of the item 110 based on the vacuum suction force, the flipper table 104 is rotated about the axis X' to manipulate the item 110 for placement in a second orientation.

FIG. 3b shows the exploded view 350 of the flipper table 104. As shown, the flipper table 104 includes a top plate 314 defining the top surface 310 and a bottom plate 316 defining the bottom surface 312. The top plate 314 and the bottom plate 316 are attached to a central frame 318, such that the central frame 318 is sandwiched between the top plate 314 and the bottom plate 316. The flipper table 104 also includes a side cover 320 that covers a side of the flipper table 104 upon engagement of the top plate 314, the central frame 318, and the bottom plate 316. Further, the top plate 314 and the bottom plate 316 of the flipper table 104 are adapted to mechanically engage, (via screws, nuts, bolts, and/or the like) with the central frame 318, thereby defining the body 302 of the flipper table 104. In this aspect, the central frame 318 of the flipper table 104 is adapted to mechanically engage with the end shaft 306. For instance, referring to the FIG. 3b, the end shaft 306 is attached to the central frame 318 of the flipper table 104. In accordance with various example embodiments, the flipper table 104 rotates about the end shaft 306 to flip the item 110, as will be described hereafter with reference to FIGS. 4a-4f and 5a-5b, respectively.

Turning back to FIG. 1, the repositioning system 105 may further include one or more sensors such as force sensor, a torque sensor, and/or a distance sensor. Thus, the position, size, and/or weight of the item 110 may be determined by the one or more sensors or any other subsystem of the material handling system 100. Further, the repositioning system 105, the controller, and/or any other subsystem of the material handling system 100 may determine that the item 110 needs to be reoriented to a second orientation before placing the item 110 onto a downstream conveyor and/or section of the material handling system 100. For example, a label and/or a marker placed on the item 110 may be upside down or the item 110 may have a longer edge that may jam or otherwise impede movement of the downstream conveyor. The item 110 may also need to be oriented in a specific orientation to fit a palletizing pattern. On determining that the item 110 needs to be reoriented, the item manipulation system 102 including the flipper table 104 may be controlled to rotate about the end shaft 306 in order to change the position and/or the orientation of the item 110. For example, the flipper table 104 may be rotated in a clockwise direction to rotate the item 110 by 90 degrees to align a label placed on the item 110 for scanning. Further, once the item 110 is reoriented as desired, the repositioning system 105 and/or the flipper table 104 may place the item 110 on the conveyor 130 and may activate one or more ejectors for respective one or more suction cups 311 for releasing the item 110 onto the conveyor 130 in the second orientation. In an embodiment, the ejector may employ compressed air directed into the one or more suction cups 311 so as to facilitate ejection or disengagement of the surface of the item 110 from the flipper table 104.

Figure 4A:
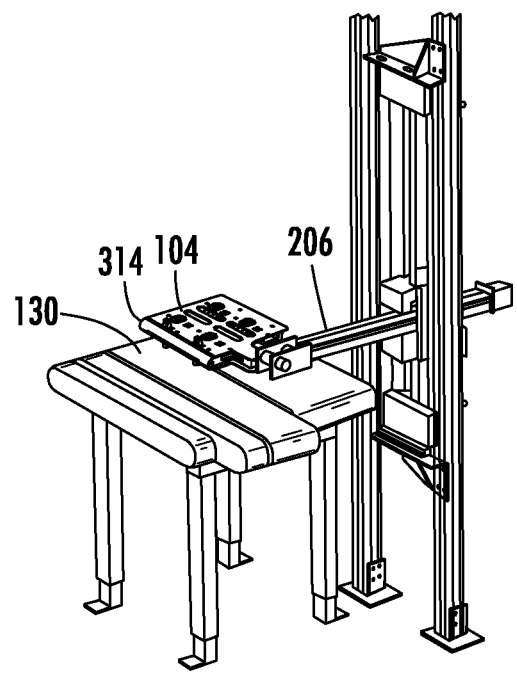
FIGS. 4a-4f illustrate multiple perspective views of the flipper table during various operations of the item manipulation system, in accordance with some example embodiments described herein.
Figure 4B:
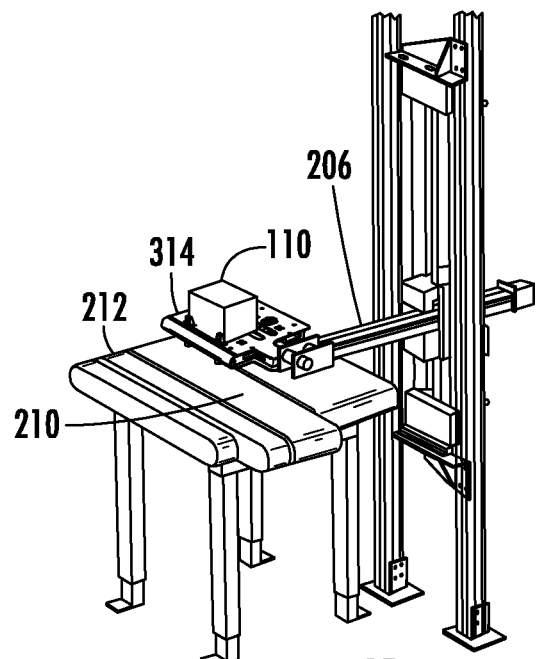

FIGS. 4*a*-4*f*, 5*a*, and 5*b* illustrate perspective views of the item manipulation system 102 including the flipper table 104 and operations performed by the item manipulation system 102 to manipulate orientation of the item 110. The flipper table 104 may receive the item 110 from a conveyor, such as the conveyor 130 on the orientation table 210, and/or may receive the item 110 directly onto the top plate 314 of the flipper table 104, as shown in FIG. 4*b*. In this aspect, the flipper table 104 may be moved across the strip belts (e.g., the narrow belt 214 and/or the wide belt 212) to a desired position (e.g., a position above the orientation table 210), based on movement of the arm portion 206 of the item manipulation system 102. As described in reference to FIG. 2, the arm portion 206 may move outward relative to the at least two posts 204-1 and 204-2 in the direction P to position the flipper table 104 at a position desired to pick the item 110 from the conveyor 130. Similarly, the arm portion 206 may move upward in the direction X or downward in the direction Y, to move the flipper table 104 to the desired position.

In accordance with various example embodiments described herein, upon receiving the item 110, the flipper table 104 may hold the item 110 based on engagement of a surface of the item 110, (e.g., a bottom surface of a box shaped item) with the one or more suction cups 311 disposed on the top plate 314 of the flipper table 104 via a vacuum suction force generated through the one or more suction cups 311. In accordance with said example embodiments, the item 110 placed on the flipper table 104 may further be supported by adjustable height supports (e.g., the at least one tab 315) that may operate to prevent translation of the item 110 relative to the top or bottom surface.

Figure 4C:
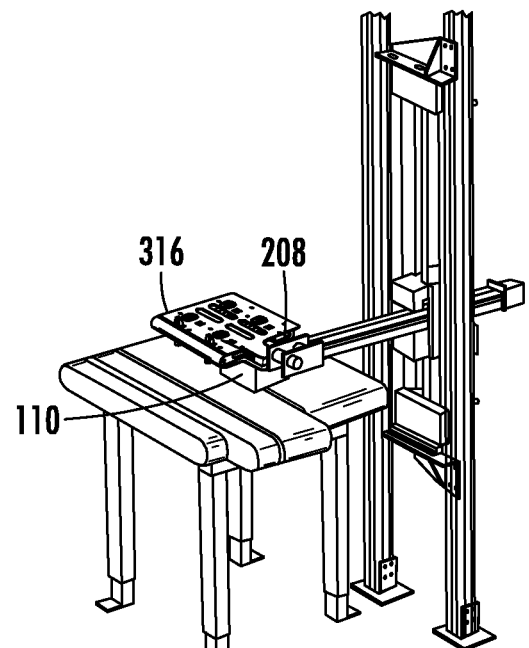

In accordance with some example embodiments, a controller coupled to the vision system 115 may determine a need for reorienting the item 110. With reference to FIG. 1, the vision system 115 may identify that the item 110 is positioned in the first orientation such that a label 109 of the item 110 is not on a top surface of the item 110. Based on this information, the controller may determine the need for manipulation of the item 110. On determining that the item 110 needs to be manipulated (e.g., flipped, repositioned, and/or reoriented), the end shaft 306 may rotate the flipper table 104 about the axis X of the end shaft 306, as shown in FIG. 4*c*. Referring to FIG. 4*c*, the flipper table 104 is illustrated rotated 180 degrees, where the bottom plate 316 is facing up and the item 110 is now facing downwards and is held suspended by the flipper table 104 via the one or more suction cups 311.

Figure 4D:
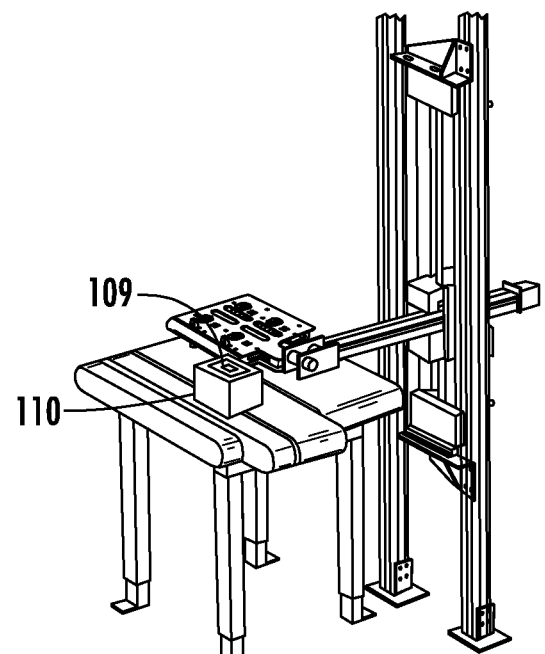

For releasing the item 110 onto the orientation table 210, as shown in FIG. 4*d*, the one or more suction cups 311 may eject the item 110 using the ejectors described above. Thus, the item 110 is reoriented from a first orientation, as shown in FIG. 4*b*, to a second orientation, as shown in FIG. 4*c*, by the flipper table 104.

Figure 4E:
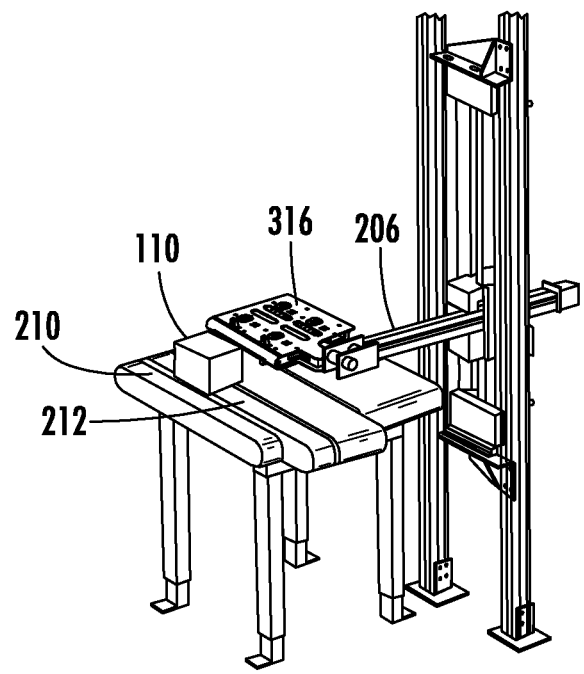
Figure 4F:
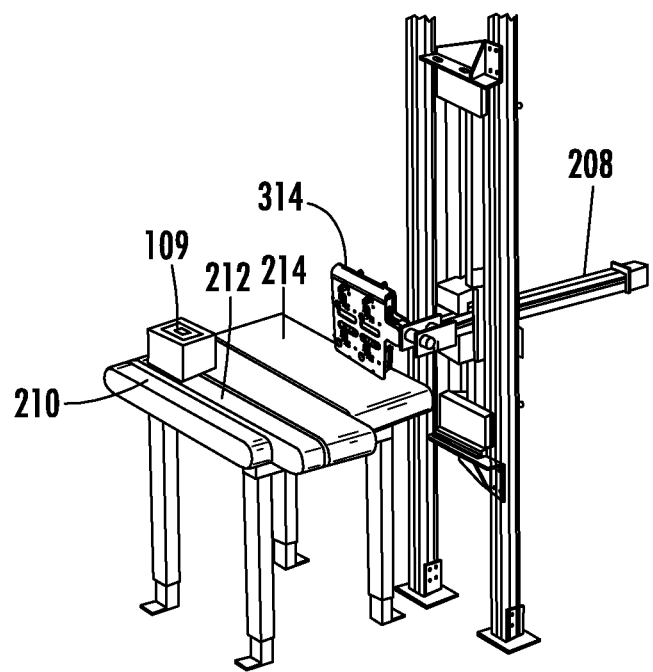
Figure 5A:
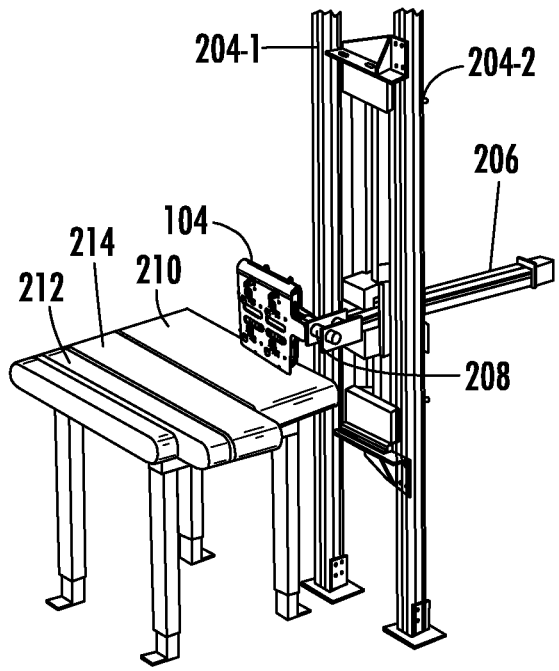
FIGS. 5a and 5b illustrate perspective views of the flipper table in a stowed position, in accordance with some example embodiments described herein.
Figure 5B:
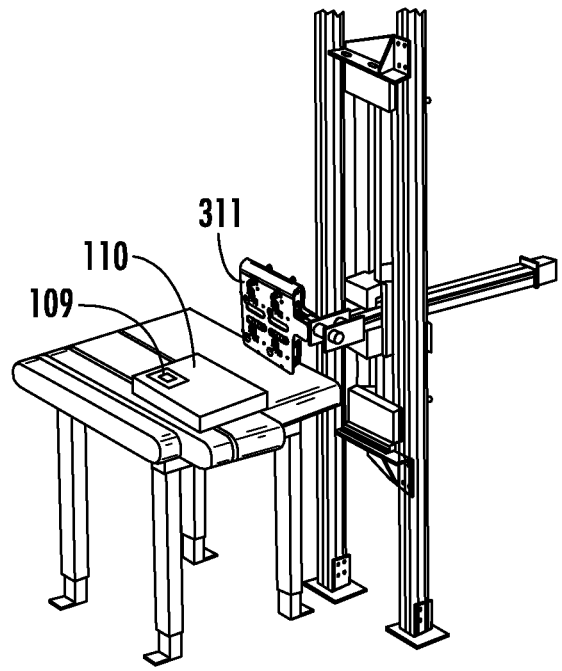

The flipper table 104 may further be used to reposition the item 110 on the conveyor 130 and/or the orientable table 210, as illustrated in FIG. 4*e*. In this regard, the arm portion 206 may extend away (i.e., move outward relative the at least two posts 204-1 and 204-2 in the direction P or move inward relative the at least two posts 204-1 and 204-2 in the direction Q) as needed to place and/or reposition the item 110 onto the orientation table 210. Also, the arm portion 206 may move upwards and/or downwards (i.e., in the direction X or Y, relative to the at least two posts, 204-1 and 204-2), to handle items of different dimensions (e.g., sizes and/or shapes). In an embodiment, once the item 110 is flipped (e.g., to the second orientation) and placed at a desired location on the orientation table 210, the arm portion 206 may retract and move inwards relative to the at least two posts 204-1 and 204-2 in a stowing position. As shown in FIG. 4*f*, the stowing position may be such that the top plate 314 and the bottom plate 316 of the flipper table 104 are positioned proximal and parallel to the at least two posts 204-1 and 204-2. The stowing position of the flipper table 104 may be indicative of a standby mode of the flipper table 104 in which the flipper table 104 is not operating to manipulate the item 110. In the stowing position of the flipper table 104, items of any size may be placed directly on the split belts (e.g., the narrow belt 214 and/or the wide belt 212). In some example embodiments, however, the flipper table 104 may be rotatable about the end shaft 306. FIG. 5*a* illustrates the stowing position of the flipper table 104 in an instance in which the flipper table 104 is not performing an operation. FIG. 5*b* illustrates another stowing position of the flipper table 104 after manipulating the item 110 from a first orientation to a label up orientation in which the label 109 face upwards and is exposed to a field of view of the vision system 115 or a sensing system.

An identification of an item and its orientation (e.g., a label up orientation), may be performed by a sensing system comprising one or more sensors (e.g., the vision system 115) and a control subsystem including the controller of the material handling system 100. In some example embodiments, the vision system 115 may include one or more cameras installed around an area of a material handling environment in which the item 110 is located. The one or more cameras may feed image data to the controller such that the controller may analyze the images at a high rate to identify a position of the item 110 within the material handling environment and/or a label of the item 110. In addition, the one or more cameras and/or the controller may also assess various characteristics of the item 110 (e.g., a size, weight, type, and/or the like). The vision system 115 may also include one or more sensors (e.g., a laser sensor, a force sensor, a torque sensor, and/or the like). The vision system 115 and/or the controller may also make an initial assessment of a product type (e.g., a bag, box, polybag, and/or the like) based on determined characteristics of the item and may select a handling procedure suited for successful handling of the item 110 by the item manipulation system 102.

In this regard, the initial assessment and identification of the product type, product size etc., may be initiated based on the sensor and/or image data collected at the time of picking and throughout the handling process. In some example embodiments, the vision system 115 and/or the controller may also apply machine learning to build a trainable model based on classification of the items to be picked into different categories prior to picking of the item and/or during the item picking. The controller may accordingly adjust an item manipulation strategy of the item manipulation system 102, for example, a picking strategy for picking the item 110. Further, the controller may also determine for the item manipulation system 102 further actions to be performed, upon picking the item by using feedback from one or more sensors (e.g., a force, torque, and/or vacuum sensor).

In some example embodiments described herein, to initialize the item manipulation system 102, at least one camera of the vision system 115 may initially scan a field of view of the vision system 115 and capture a video feed or one or more images of a material handling environment including the item 110. Based on processing the one or more images or the video feed, the controller may identify an item 110 to be manipulated by the item manipulation system 102. In some example embodiments, the initial scan can be used to identify an orientation of the item 110 and a classification of the item 110 as having a product type such as a bag, a box, a polybag, or other. In this aspect, depending on an orientation and product type, the item may require manipulation, by the item manipulation system 102, using a selected item handling procedure.

Once the item 110 has been classified by product type and size, the item 110 can be picked up to create information from a variety of sensors such as, but not limited to force, torque, vacuum signal, and distance to measure item weight. These sensors may provide additional information such as center of gravity, vacuum adhesion, mass, and the like, which may be considered for initiating the manipulation of the item.

FIG. 6 illustrates an example flowchart of an operation performed by the item manipulation system 102 including the flipper table 104, as described in FIGS. 1-5b, in accordance with example embodiments of the present invention. It will be understood that each block of the flowchart and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6 when executed, convert a computer or processing circuitry into a particular machine configured to perform an example embodiment of the present invention. Accordingly, the operations of FIG. 6 define an algorithm for configuring a computer or processor, to perform an example embodiment. In some cases, a general purpose computer may be provided with an instance of the processor which performs the algorithm of FIG. 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 6 illustrates a flowchart describing a method 600 for manipulating an item from a first orientation to a second orientation in a material handling environment by the item manipulation system 102, as described in reference to FIGS. 1-5b.

According to various example embodiments, the item manipulation system 102 may include means such as a processing unit of the controller to detect the item 110 to be positioned in the first orientation. In this aspect, the processing unit detects the item 110 to be positioned in the first orientation based on processing sensing data received from one or more sensors (e.g., sensors of the vision system 115). Further, the processing unit may also receive an input (e.g., from a user or the vision system) that is indicative of a requirement of changing of an orientation of the item 110 from the first orientation to the second orientation. The item manipulation system 102 may accordingly initiate a manipulation of the item 110 from the first orientation to the second orientation.

At step 602, the item manipulation system 102 may include means, such as the flipper table 104, for receiving an item in a first orientation. In this aspect, the flipper table 104 includes a body configured to manipulate the item from the first orientation to the second orientation. For instance, referring to FIGS. 3a and 3b, the flipper table 104 includes the body 302, having the top surface 310 configured to support the item 110 thereon. Further, the body 302 also includes the at least one tab 315 that is configured to extend relative to the top surface 310, to provide additional support for the item 110 positioned thereon on the top plate 314 and prevent the item 110 from falling off (e.g., translating relative to the top surface).

According to some example embodiments, the item 110 may be received on the top surface 310 of the flipper table 104. For instance, the repositioning system 105 may pick the item 110 from a downstream conveyor or the chute 125 and place the item 110 on the top plate 314 of the flipper table 104. Additionally and/or alternatively, the item 110 may be received on the bottom surface 312 of the flipper table 104. In some cases, the item 110 may be positioned on the conveyor 130 and may be picked by the one or more suction cups 311 disposed on the bottom plate 316 of the flipper table 104.

As described above, the body of the flipper table 104 also defines the one or more suction cups 311. In this aspect, at step 604, the one or more suction cups 311 defined by the body 302 of the flipper table 104 engages a surface of the item 110. Upon placement of the item 110 on the top surface 310, the controller may activate vacuum generators which actuate the one or more suction cups 311 to grasp the item 110 based on a vacuum suction force transmitted via the respective one or more suction cups 311.

Upon engaging the item 110 at step 606, the item manipulation system 102 includes means such as the controller to cause the rotation of the flipper table 104 about an axis to position the item 110 in a second orientation. In this regard, the second orientation in which the item 110 is repositioned is different from the first orientation in which the item 110 is received by the flipper table 104. In some embodiments, the second orientation is a label up orientation in which a label including an identifier (e.g., a barcode, a QR code, and/or the like) is exposed to a field of view of the vision system 115.

In accordance with various example embodiments described herein, the flipper table 104 may receive the item 110 in the first orientation from a first conveyor, for example, the conveyor 130. Further, the flipper table 104 may position the item 110 in the second orientation. The item 110 may be repositioned on either a second conveyor or the first conveyor itself, in the second orientation.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A flipper table for manipulating items, the flipper table comprising:
   a body rotatable about an axis, the body defining:
      an end configured to be mechanically attached to an actuation unit, wherein the body is configured to, upon an actuation of the actuation unit, manipulate an item from a first orientation to a second orientation; and
      a top surface configured to support the item positioned thereon;
   at least one height adjustable tab disposed on the flipper table, wherein the at least one height adjustable tab is configured to abut the top surface of the body on which the item is positioned; and
   one or more suction cups, disposed on the top surface the body, wherein the one or more suction cups are configured to engage a surface of the item positioned on the top surface.

2. The flipper table according to claim 1, wherein the body further defines a bottom surface opposite the top surface and adapted to support another item, wherein the bottom surface comprises one or more bottom suction cups and the at least one height adjustable tab to support the item held on the bottom surface.

3. The flipper table of claim 2, wherein the flipper table is configured to:
   rotate about the axis so as to reposition the item supported by the top surface from the first orientation to the second orientation; or
   rotate about the axis so as to reposition the another item supported by the bottom surface from a third orientation to a fourth orientation.

4. The flipper table of claim 3, wherein the second orientation corresponds to a position of the item in which a label of the item is exposed in a field of view of a sensing system.

5. The flipper table of claim 1, wherein the at least one height adjustable tab is configured to extend through the body of flipper table, and wherein the at least one height adjustable tab is configured to:
   extend relative to the top surface on which the item is positioned; and
   facilitate a movement of the flipper table about a plurality of teeth defined by the at least height adjustable one tab.

6. The flipper table of claim 1, further comprising a shaft that is rotatable based on the actuation of the actuation unit, and wherein the body of the flipper table further comprises:
   a central frame adapted to mechanically engage with the shaft;
   a top plate adapted to mechanically engage with the central frame; and
   a bottom plate adapted to mechanically engage with the central frame.

7. An item manipulation system comprising:
   a mounting unit comprising:
      at least two posts; and
      an arm portion mounted between the at least two posts and pivotably engaged to a first end of a shaft, wherein the arm portion is adapted to move relative to the at least two posts; and
   a flipper table adapted to manipulate an item from a first orientation to a second orientation, wherein the flipper table is pivotably engaged to a distal end of the arm portion, the flipper table comprising:
      a body rotatable about an axis of the shaft, the body defining:
         an end configured to be mechanically engaged with the shaft;
         a top surface configured to support the item positioned thereon;
         at least one tab disposed on the flipper table, wherein the at least one tab is configured to abut the top surface of the body to support the item positioned; and one or more suction cups, disposed on the top surface the body, wherein the one or more suction cups are configured to engage a surface of the item positioned on the top surface.

8. The item manipulation system of claim 7, wherein the body of the flipper table further comprises:
   a central frame adapted to mechanically engage with the shaft;
   a top plate adapted to mechanically engage with the central frame; and
   a bottom plate adapted to mechanically engage with the central frame.

9. The item manipulation system of claim 7, wherein the flipper table is adapted to rotate about the axis of the shaft, to change an orientation of the item positioned over the top surface of the flipper table from the first orientation to the second orientation.

10. The item manipulation system of claim 7, wherein the flipper table is adapted to manipulate the item positioned in the first orientation on a first conveyor to the second orientation on the first conveyor or a second conveyor.

11. The item manipulation system of claim 7, wherein the at least one tab is configured to extend through the body of flipper table, and wherein the at least one tab is configured to:
   extend relative to the top surface on which the item is positioned; and
   facilitate a movement of the flipper table about a plurality of teeth defined by the at least one tab.

12. The item manipulation system of claim 8, wherein the flipper table is rotatable about the shaft so as to orient the flipper table in a stowing position indicative of a standby mode of the flipper table, wherein in the stowing position the top plate and the bottom plate of the flipper table are positioned proximal and parallel with respect to the at least two posts.

13. The item manipulation system of claim 7, wherein the second orientation corresponds to a position of the item in which a label of the item is exposed in a field of view of a sensing system.

14. The item manipulation system of claim 7, wherein the flipper table is adapted to engage the item via the one or more suction cups of the flipper table so as to reposition the item via movement of the arm portion.

15. A method for manipulating an item comprising:
   receiving, by a flipper table, an item in a first orientation, wherein the flipper table comprises a body configured to manipulate the item from the first orientation to a second orientation, the body comprising: a top surface configured to support the item thereon, at least one height adjustable tab disposed on the flipper table and configured to abut the top surface of the body on which the item is positioned, and one or more suction cups disposed on the top surface of the body;
   engaging, by the one or more suction cups, a surface of the item; and
   upon engaging the item, rotating the flipper table about an axis to position the item in the second orientation.

16. The method of claim 15, further comprising receiving the item in the first orientation on either the top surface or a bottom surface of the flipper table, from a conveyor unit, positioned proximate to the flipper table, wherein the bottom surface of the flipper table comprises one or more bottom suction cups adapted to engage the surface of the item.

17. The method of claim 15, wherein engaging of the one or more suction cups on the flipper table is based on:
   detecting, by a processing unit, the item to be positioned in the first orientation wherein the processing unit detects the item to be positioned in the first orientation based on processing sensing data received from a sensing unit; and
   receiving, by the processing unit, an input indicative of a requirement of changing an orientation of the item from the first orientation to the second orientation.

18. The method of claim 15, comprising:
   receiving by the flipper table the item in the first orientation from a first conveyor; and
   positioning the item in the second orientation on either the first conveyor or a second conveyor.

19. The method of claim 15, wherein the second orientation corresponds to a position of the item in which a label of the item is exposed in a field of view of a sensing system.

20. The method of claim 15, comprising:
   extending the at least one height adjustable tab relative to the top surface on which the item is positioned; and
   facilitating a movement of the flipper table about a plurality of teeth defined by the at least one height adjustable tab, to support the item positioned on the top surface.

* * * * *